Oct. 19, 1943.  A. KOUSCHPIL  2,332,449
UNIVERSAL TOOL HOLDER
Filed April 21, 1942
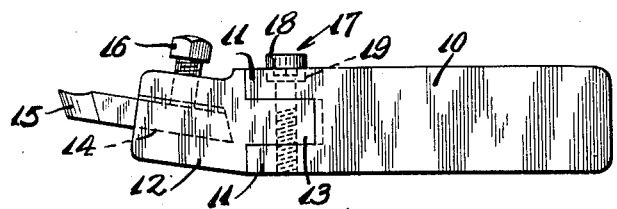
Fig. 1.
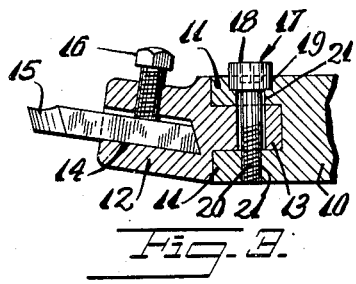
Fig. 3.
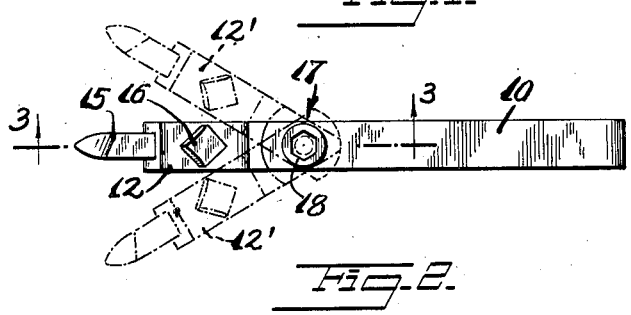
Fig. 2.
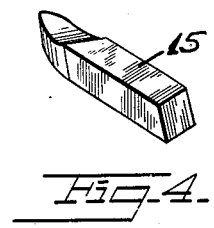
Fig. 4.
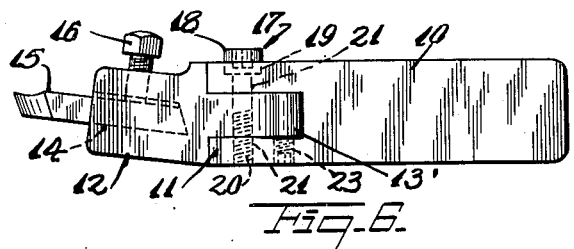
Fig. 6.
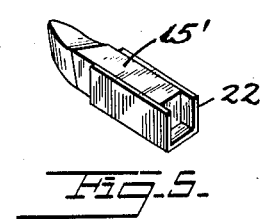
Fig. 5.
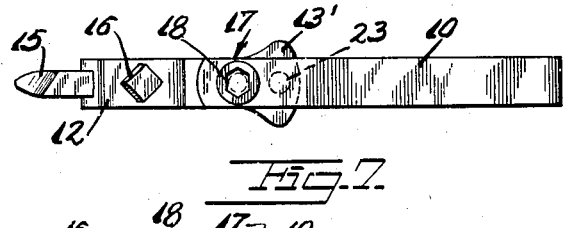
Fig. 7.
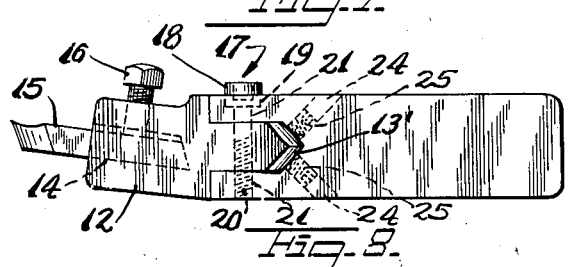
Fig. 8.
Fig. 9.
INVENTOR
Afanasi Kouschpil
BY
ATTORNEY Patented Oct. 19, 1943

2,332,449

UNITED STATES PATENT OFFICE 2,332,449

UNIVERSAL TOOLHOLDER

Afanasi Kouschpil, New York, N. Y.

Application April 21, 1942, Serial No. 439,863

3 Claims. (Cl. 29—96)

This invention relates to new and useful improvements in a universal tool holder.

More specifically, the invention proposes the construction of a universal tool holder characterized by a shank having a pivotally mounted tool head normally in end alignment with said shank and movable to extend either to the right or the left of the shank in a manner to permit the single tool holder to be used as a straight, left-hand or right-hand tool holder.

Heretofore, it has been customary to provide each lathe operator with a straight tool holder, a left-hand tool holder and a right-hand tool holder to meet the requirements of the jobs being done by the operator. This invention proposes replacing these three tools with a single tool constructed to be adjustable to meet the requirements of either of the three tools previously used, resulting in a saving of metal and reducing the number of tools the operator must handle.

Another object of this invention proposes forming the shank with a bifurcated front end with the branches thereof slightly flexible and having the reduced end portion formed on the tool head disposed therebetween with a screw engaged through the overlapping portions of said branches and said reduced end portion for pivotally supporting the tool head and for drawing the branches together to frictionally grip the top and bottom faces of the reduced end portion and securely lock the tool head in various adjusted pivoted positions with relation to the shank.

It is a further object of this invention to form the front end of the tool head with a socket opening into which the blunt end of a cutting tool is adapted to be engaged and to provide the tool head with a means for securely locking the cutting tool in position within the socket opening in a manner to facilitate the engagement of the cutting tool against the work being shaped upon the lathe.

Another object of this invention proposes the construction of a universal tool holder which is simple and durable and which may be manufactured and sold at a reasonable cost.

For further comprehension of this invention, and of the objects and advantages thereof, reference will be had to the following description and accompanying drawing, and to the appended claims in which the various novel features of the invention are more particularly set forth.

In the accompanying drawing, forming a material part of this disclosure:

Fig. 1 is a side elevational view of a universal tool holder constructed in accordance with this invention.

Fig. 2 is a top plan view of Fig. 1.

Fig. 3 is a fragmentary vertical sectional view taken on the line 3—3 of Fig. 2.

Fig. 4 is a perspective view of the cutting tool, per se.

Fig. 5 is a perspective view of a cutting tool, per se, in accordance with a modification of this invention.

Fig. 6 is a view similar to Fig. 1 but illustrating a modification of the invention.

Fig. 7 is a plan view of Fig. 6.

Fig. 8 is a side elevational view of a tool holder constructed in accordance with another modification of this invention.

Fig. 9 is a plan view of Fig. 8.

The universal tool holder, according to this invention, includes a shank 10 which is adapted to be mounted upon a lathe or other similar machine. The shank 10 is substantially rectangular in cross section and has its greatest dimension in the vertical to take maximum stress in the vertical. The front end of the shank 10 is bifurcated and has its branches 11 superimposed one upon the other and very slightly flexible.

A tool head 12 is disposed upon the front end of the shank 10. This tool head 12 is formed with a reduced rear end portion 13 which engages between the adjacent faces of the branches 11 of the shank.

The front end of the tool head 12 is formed with an inwardly extending socket opening 14. The blunt end of a cutting tool 15 is adapted to be extended into the socket openings 14. A clamp screw 16 is threadedly mounted through the side of the tool head 12 and is engageable against the cutting tool 15 to securely hold the cutting tool 15 in position within the socket opening.

Means is provided for holding the tool head 12 in an aligned position with the shank 10 as illustrated by the full lines in Fig. 2 or in a right-hand or a left-hand pivoted position relative to the shank 10 as illustrated by the dot and dash lines 12' in Fig. 2. This is accomplished by a socket head screw 17. The screw 17 has an enlarged head 18 which extends partially into an opening 19 formed in the topmost branch 11 of the shank 10. The head 18 of the socket screw 17 continues into a shank 20 which extends through aligned openings 21 formed in the overlapping portions of the remainder of the top branch 11, the reduced end portion 13 and the bottom branch 11.

The openings are in end alignment with each other and extend concentrically downwards from the bottom end of the opening 19 into which the head 18 of the screw 17 extends. The shank 20 of the screw 17 is formed with threads which engage complementary threads formed in the opening 21 formed in the bottom branch 11 of the shank 10.

The operation of this form of the invention is as follows:

To mount a cutting tool 15 in the socket opening 14, the clamp screw is turned to a position in the interior of the socket opening is unobstructed. The blunt end of the cutting tool 15 is then extended into the socket opening 14 and the screw 16 is turned inwards to engage the cutting tool and rigidly clamp the cutting tool in position.

The shank 10 of the holder is then mounted in position upon the lathe or other machine. To adjust the angular position of the tool head 12 with relation to the shank 10, the socket screw 17 is turned outwards. The head 18 of the screw 17 is formed with a socket opening into which a turning tool is adapted to be engaged for facilitating the turning of the screw 17. This outward movement of the screw 17 frees the tool head 12 to be pivoted into any desired position relative to the shank 10 about the screw 17. When the desired adjusted position of the tool head is reached, the screw 17 is turned inwards causing the inner faces of the branches 11 to frictionally engage and grip the reduced end portion 13. When the screw 17 is turned, the engagement of the head 18 against the base of the opening 19 and the threaded engagement of the shank 20 with the opening 21 in the bottom branch 11 causes the branches to be flexed slightly towards each other to clamp and frictionally grip the end portion 13.

In Fig. 5 a cutting tool 15' of different shape is illustrated. The cutting tool 15' has a thickness less than the width of the socket opening 14 formed in the front end of the tool head 12. A shim 22 is adapted to be mounted upon the cutting tool 15' to increase the thickness of the cutting tool 15' to correspond with the width of the socket opening 14 and cause the cutting tool 15' to seat solidly within the socket opening.

In Figs. 6 and 7 a modified form of universal tool holder is illustrated in which means is provided for assisting the screw 17 in locking the tool head 12 in various adjusted pivoted positions relative to the shank 10. This means comprises a set screw 23 which threadedly engaged through the bottom branch 11 of the shank 10, and which has its upper end engaging the bottom face of the end portion 13' of the tool head 12. The end portion 13' is fan shaped so as to be engaged by the set screw 23 in all of the adjusted positions of the tool head 12 relative to the shank 10. The engagement of the set screw 23 against the reduced end portion 13' in addition to assisting in holding the tool head 12 fixedly in position against pivoting, also acts to hold the tool head 12 from vibrating vertically relative to the shank 10 when the cutting tool is brought into contact with the rapidly rotating work upon which the cutting tool is being used.

In other respects this form of the invention is similar to that previously described, and like reference numerals are used to identify like parts in each of the several views.

In Figs. 8 and 9 another method of assisting the screw 17 in locking the tool head 12' fixedly in position is illustrated. In this form of the invention the tool head 12 is formed with a fan shaped reduced end portion 13ª having converging inclined rear walls. Openings 24 are formed in the shank 10 and extend at right angles from the converging rear walls of the reduced end portion 13ª. Socket set screws 25 are threadedly engaged into the openings 24 and bear against the converging rear walls of the reduced end portion 13ª. The set screws 25 assist the screw 17 in locking the tool head 12 fixedly in position and also serve to hold the tool head against vertical vibration relative to the shank 10.

In other respects this form of the invention is similar to the first form, and like reference numerals are used to identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A universal tool holder having a shank formed with a bifurcated end forming spaced branches and a tool head having a reduced end disposed between said branches with a screw engaged through said overlapped branches and reduced end for clamping said tool head in various pivoted positions relative to said shank, said reduced end on said tool head being fan shaped and having converged inclined rear end walls, and means engageable against said inclined rear end walls for assisting said screw in clamping said tool head in position.

2. A universal tool holder having a shank formed with a bifurcated end forming spaced branches and a tool head having a reduced end disposed between said branches with a screw engaged through said overlapped branches and reduced end for clamping said tool head in various pivoted positions relative to said shank, said reduced end on said tool head being fan shaped and having converged inclined rear end walls, and means engageable against said inclined rear end walls for assisting said screw in clamping said tool head in position, comprising set screws threadedly engaged into openings formed in said shank and bearing against said inclined rear end walls.

3. A universal tool holder having a shank formed with a bifurcated end forming spaced branches and a tool head having a reduced end disposed between said branches with a screw engaged through said overlapped branches and reduced end for clamping said tool head in various pivoted positions relative to said shank, said reduced end on said tool head being fan shaped and having converged inclined rear end walls, and means engageable against said inclined rear end walls for assisting said screw in clamping said tool head in position, comprising set screws threadedly engaged into openings formed in said shank and bearing against said inclined rear end walls, said openings in said shank being formed at right angles to said inclined rear end walls so that said set screws will have their inner ends seated solidly against said inclined rear end walls.

AFANASI KOUSCHPIL.